United States Patent [19]

Sills et al.

[11] 3,920,195

[45] Nov. 18, 1975

[54] AUTOMATIC TAPE REEL MOUNT

[75] Inventors: Richard E. Sills; Gary L. Allison, both of Boulder, Colo.

[73] Assignee: Xytex Corporation, Boulder, Colo.

[22] Filed: Jan. 9, 1974

[21] Appl. No.: 432,063

[52] U.S. Cl. .......................... 242/180; 214/16.4 R

[51] Int. Cl.² .......................... G03B 1/04; G11B 15/32; B65G 47/00; B65G 65/02

[58] Field of Search ............ 242/180, 181, 58.6, 79; 214/16.4 R, 16.4 A, DIG. 4

[56] References Cited

UNITED STATES PATENTS

| | | | |
|---|---|---|---|
| 1,807,360 | 5/1931 | Wehr | 214/DIG. 4 |
| 2,596,477 | 5/1952 | Frischmann et al. | 214/DIG. 4 |
| 3,034,675 | 5/1962 | Quayle | 214/16.4 A |
| 3,134,550 | 5/1964 | Camras | 242/181 |
| 3,782,565 | 1/1974 | Doran et al. | 214/16.4 A |

*Primary Examiner*—Leonard D. Christian
*Attorney, Agent, or Firm*—John E. Reilly; Earl C. Hancock

[57] ABSTRACT

An on-line automated tape library system includes an automatic reel mount assembly for selectively recovering a tape reel from a pre-load station, advancing it to a drive position where the reel is automatically placed onto a tape drive, thereafter withdrawing the tape reel from the tape drive and advancing it to a post-load station where it is released for pick-up and return to storage in the library. A chuck assembly is associated with the automatic reel mount for the purpose of selectively engaging the tape reel, or cartridge in which the tape reel is contained, and specifically in such a way as to securely and positively but releasably engage the rim of the cartridge for advancement between each station and to selectively release the cartridge at each station.

22 Claims, 10 Drawing Figures

AUTOMATIC TAPE REEL MOUNT

This invention relates to automated handling systems for magnetic tape reels and the like; and more particularly relates to a novel and improved method and means for automatic handling of a magnetic tape reel in advancing the reel to or from a storage location and a tape deck for reading and writing information on the tape.

Various tape library systems have been devised for storage and handling of magnetic tape reels. More sophisticated systems presently in use, commonly referred to as on-line tape library systems, permit storage and automatic retrieval of information contained on tape reels which are contained in tape cartridges of the self-threading type. Typically, hardware associated with the library system is capable of retrieving any tape reel upon command from a computer from its storage position and advancing it to a tape drive for reading or writing information thereon, and thereafter will automatically return the tape reel to its original position. One such on-line tape library is that manufactured and sold by Xytex Corporation of Boulder, Colo., assignee of the present invention. In that system, a modular tape library includes storage modules in which the tape cartridges are stored in upright positions in individual storage cells arranged in rows along opposite sides of each module. A selector/positioning mechanism advances along a center aisle between opposite sides of the module and, under control of command signals from a computer, is capable of automatic retrieval of a desired tape cartridge. Specifically, the selector/positioning mechanism will engage the tape cartridge, remove it from its cell and advance it to a pre-load position internally of the library but adjacent to a tape drive located externally of the library. The tape cartridge selected can then be picked up from the pre-load position, advanced through an access passageway and mounted on the tape drive. Upon completion the tape cartridge and reel can be removed from the tape drive and returned through the passageway for disposition in a post-load position; or if desired can be returned to its same pre-load position. In the on-line tape library of the type described it is highly desirable that mechanism be provided which is capable of handling each tape reel for advancement from the pre-load position to the tape drive and subsequently for return to the post-load position, and to perform these functions automatically and through utilization of mechanism which will not require assistance from or use of the selector/positioning mechanism. In this way, the selector/positioning mechanism is free to operate independently of the reel-loading and unloading mechanism for the tape drive to recover cartridges from storage for placement at the pre-load station, or to return cartridges to storage, while other cartridges are being advanced to or from the tape drive. Additionally, it is desirable to provide one common selector/positioning mechanism which will advance along several modules arranged in end-to-end relation wherein each is provided with a separate tape drive and associated pre-load and post-load storage stations. In either case, separate automated handling systems can be provided between the pre-load and post-load storage stations and the tape drives to handle the tape reels for mounting and removal with respect to the tape drive and which reel-handling mechanisms will operate automatically upon command from the computer to effect rapid advancement between the storage stations and the tape drive in a reliable and efficient manner. Moreover, as hereinafter will become more readily apparent, problems associated with reliable engagement and release of a tape cartridge and its mounting on the tape drive require a different type of engagement mechanism than that employed in removal and replacement of the tape cartridges in individual storage cells in the tape library; and such reel engagement and release mechanisms must be capable of operating in close correlation with the reel-handling mechanism which is employed to advance the reels between the storage stations and the tape drive.

Accordingly, it is an object of the present invention to provide for a novel and improved reel-handling mechanism which is specifically adaptable for use in tape storage or library systems; and further wherein such tape handling mechanism is capable of advancing the tape reel between the different positions automatically in a closely-coordinated sequence of steps.

It is another object of the present invention to provide a reel-handling system conformable for handling any of the existing cartridge-reel systems in a dependable manner and particularly is capable of positive engagement and release with respect to cartridges of the self-threading type.

It is a further object of the present invention to provide for a high-speed automatic reel mount assembly which is durable, reliable and efficient in operation and will not damage tape reels in mounting the tape reels on a tape drive and thereafter selectively recovering the tape reels for return to a storage position.

A still further object of the present invention is to provide for a novel manner and means for engaging and releasing a tape cartridge of the self-threading type which is closely correlated with the operation of a reel transport mechanism to afford positive mechanical engagement and release of the tape reel at the desired intervals.

It is an additional object of the present invention to provide for a reel-handling mechanism which is readily replaceable and easily serviced and further is capable of handling as many as three reels simultaneously and independently of selector/positioning mechanisms employed in a tape library system.

It is an additional object of the present invention to provide for an automatic reel mounting assembly which is capable of two-axes-indexing to four different locations in advancing a tape reel between inner spaced storage stations located within a tape library and an outer tape drive station located externally of the tape library.

In accordance with the present invention, an automated reel mount assembly has been devised for use with automated tape library systems and which is specifically adapted for transferring magnetic tape reels between pre-load and post-load upright storage positions or stations and a tape drive station located externally of the tape library. In the preferred form of system devised, the automatic reel mount assembly advances along a horizontal guide path between the inner spaced pre-load and post-load storage stations within the library and a conventional tape drive located externally of the library. The reel mount assembly includes a chuck mechanism provided with radially movable fingers arranged in circumferentially spaced relation to one another which can be radially expanded into engagement with the inner edge of a rim forming a part of the tape cartridge for the tape reel. The fingers can also be remotely controlled to undergo radial retraction away from engagement with the cartridge when it is desired to release same either at one of the storage stations or at the tape drive station. Cartridge drive means forming a part of the automated reel mounting assembly selectively advances the chuck assembly along the guide path between the stations. A second drive means is capable of advancing the chuck assembly horizontally in a direction perpendicular to the first horizontal guide path in moving the chuck assembly toward and away from each of the stations; and a third drive means is capable of advancing the chuck assembly vertically to compensate for any vertical displacement between the respective stations. Accordingly, the chuck assembly is capable of undergoing three-dimensional movement in moving into engagement with a tape cartridge located at the pre-load station, reversing its travel away from the pre-load station, advancing horizontally along the guide path to the tape drive station, then advancing perpendicularly with respect to the guide path toward the tape drive station until the cartridge is mounted thereon, at which point the chuck assembly is selectively released from the tape drive. Upon completion of information retrieval at the tape drive station, the automated reel mount assembly is once again advanced into engagement with the tape cartridge, reversed in its travel away from the tape cartridge and advanced along the horizontal guide path to a point opposite to the post-load station. The third drive means will advance the chuck assembly and cartridge vertically to align it with the post-load station, after which the cartridge is advanced into engagement with the station and the chuck assembly released from the cartridge.

Other objects, advantages and features of the present invention will become more readily understood and appreciated from a consideration of the following detailed description of a preferred embodiment of the present invention when taken together with the drawings, in which.

Figure 1:
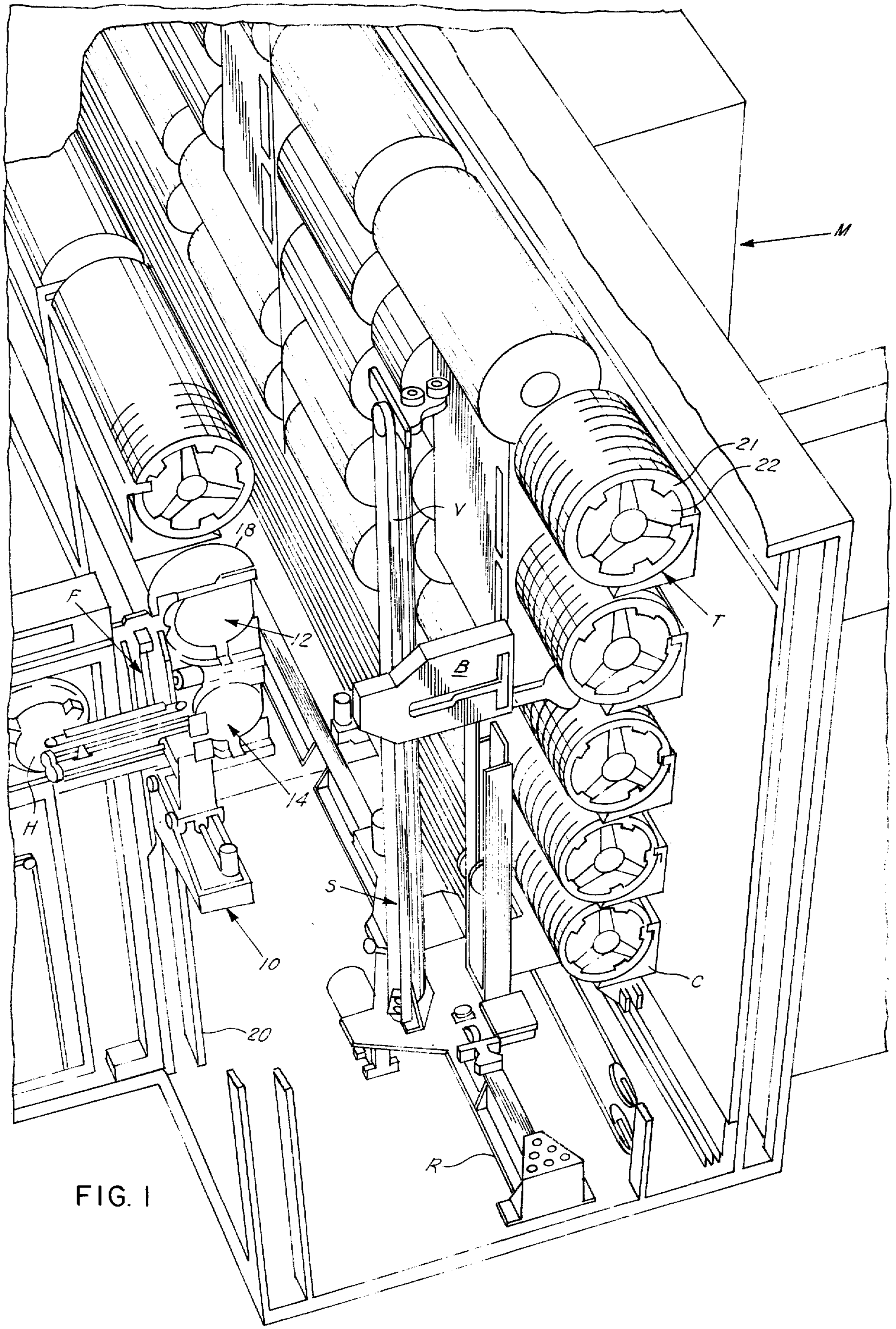
FIG. 1 is a perspective view with portions broken away to illustrate disposition of a preferred form of automatic reel mount assembly in an automated tape library system module.

Referring in more detail to the drawings, and as a setting for the present invention, an on-line tape library unit is shown in FIG. 1 and is specifically a Xytex automated tape library module M, which is viewed from one end with portions of the outer walls or closure removed to illustrate mounting and disposition of rows of tape cartridges T in upstanding, side-by-side relation to one another in storage cells represented at C. A selector/positioning mechanism S advances along the center aisle of the module on a drive rail R between the rows of tape cartridges and includes a picker mechanism B which is automatically controlled to move vertically as well as horizontally toward and away from the tape cartridges to pick up and return a selected tape cartridge. Additionally, the picker mechanism can be rotated about its vertical mounting post V when necessary to advance a tape cartridge from one side of the module to the opposite side in loading or unloading onto and from the automated reel mount assembly 10 to be described.

In the representative form of tape library module shown, tape drive D is mounted externally of the module and directly outside of a passageway or opening P through one side of the module with its drive spindle or hub H on an axis parallel to the axes of tape cartridges T mounted in the module M. The passageway P affords access between the interior of the module and the tape drive for the purpose of passing a selected tape cartridge through the passageway into engagement with the tape drive under the control of the automatic reel mount assembly 10 in accordance with the present invention. Briefly, in order to read or write information on a given tape reel, the automatic reel mount assembly 10 is mounted in the passageway P between the tape drive D on the exterior of the module and pre-load station 12 and post-load station 14 located on the inner wall of the module adjacent to the side edge of the passageway directly opposite to the tape drive and facing in the same direction as the tape drive.

Figures 2, 9:
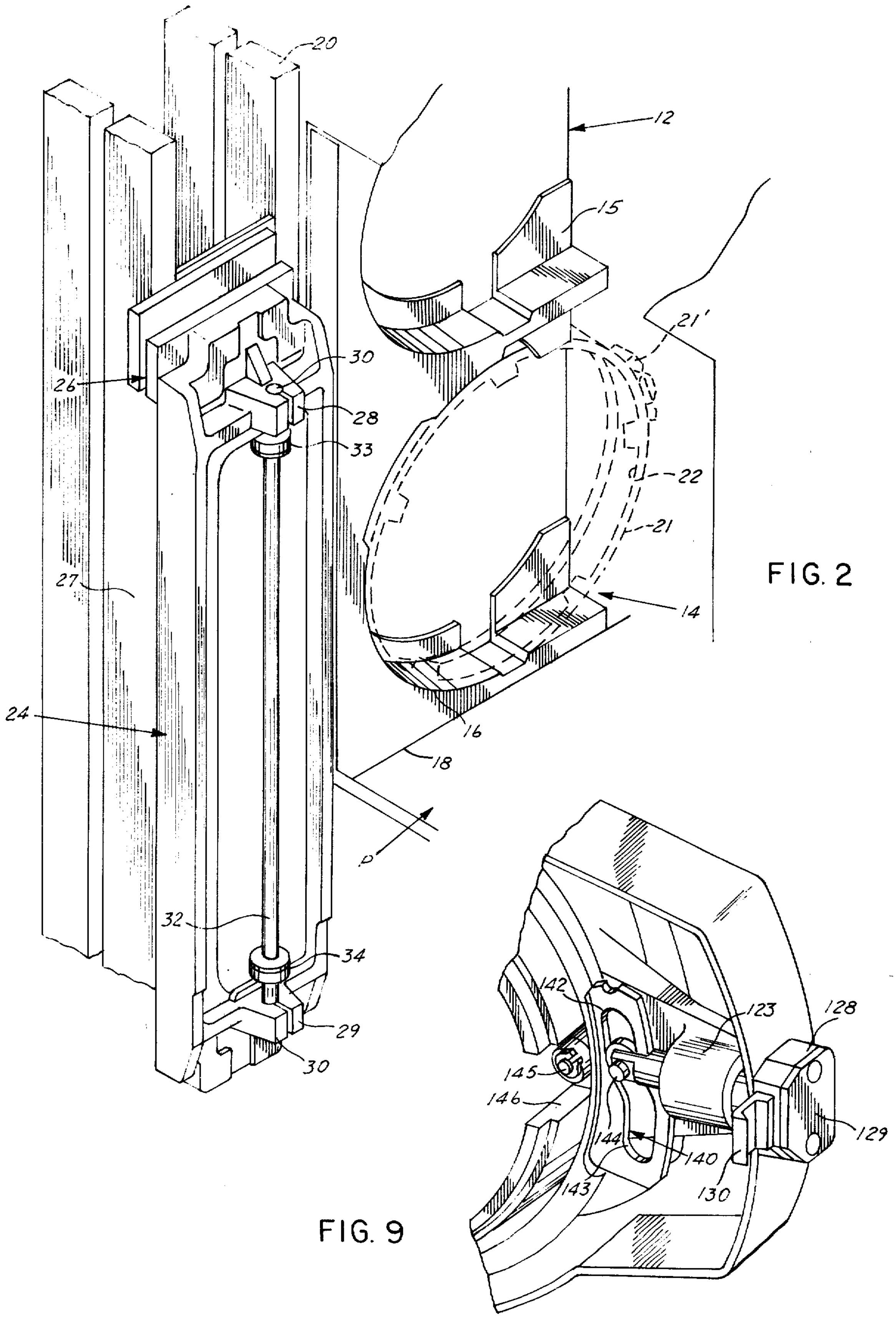
FIG. 2 is a perspective view enlarged illustrating in more detail the cartridge way and its disposition in a passageway in the tape library module as shown in FIG. 1.
FIG. 9 is an enlarged perspective view in more detail of the portion of the preferred form of chuck assembly specifically illustrating one of the retractible finger units.

As further shown in FIG. 2, the pre-load station 12 is located directly above the post-load station 14, and the stations 12 and 14 are correspondingly made up of shallow circular receptacles 15 and 16, respectively, formed on a common, generally rectangular support 18 which is affixed to the inner side wall 20 of the module along a vertical edge of the passageway and project inwardly therefrom so as to face in a direction normal to the passageway. The tape drive unit D conventionally may be a Model 3420 self-threading tape drive manufactured by International Business Machines Corporation and the tape cartridges T may suitably be of the self-threading type in which an outer circular rim 21 encases the outer periphery of a tape reel and employs a vacuum threading system to selectively remove the leading edge of the tape from the reel when placed in the tape drive unit to wind and unwind the tape in reading and writing information thereon. For example, the tape cartridge may be of the type disclosed in the U.S. Pat. to Fitzgerald et al. No. 3,620,478 and owned by International Business Machines Corporation. In this specific type, the rim 21 is of generally U-shaped cross-sectional configuration with opposite sides overlapping the reel and forming a circumferential edge 22 on opposite sides of the cartridge which is engageable by the chuck assembly in a manner to be hereinafter described. Locating ribs 21' are adapted to be aligned with key ways on the tape drive hub H.

The construction and arrangement of the automatic reel mount 10 can be best appreciated from a consideration of the basic function which it performs in cooperation with the selector/positioning mechanism S.

Briefly, the selector/positioning mechanism S has a picker mechanism B which is capable of riding in a vertical direction on the post V and of advancing horizontally toward and away from the tape cartridges positioned in their respective storage cells. Thus the picker mechanism is brought into alignment with the desired tape cartridge, such as, by means of a command signal from a computer or memory device, then is advanced into engagement with the cartridge to remove it from its cell and be retracted back to a center position. The entire mechanism S is then advanced along the rail R until the picker mechanism B is aligned opposite to the pre-load and post-load stations 12 and 14, at which point the picker mechanism is advanced vertically to horizontally align the tape cartridge with the pre-load station 12. If necessary the picker mechanism B is then rotated about the post V and is then advanced horizontally to move the cartridge into position at the pre-load station, at which time the tape cartridge is released by the picker mechanism. Once the tape cartridge is loaded, the automatic reel mount assembly 10 has as its purpose to transfer the tape cartridge from the pre-load station 12 to the tape drive D. After the tape reading or writing operation is performed by the tape drive, the automatic reel mount assembly is controlled to remove the tape cartridge from the tape drive and return it through the passageway P into registration with the post-load station 14. The selector mechanism S will then pick up the tape cartridge from the post-load station 14 and return it to the original storage position within the library.

Figures 3, 5:
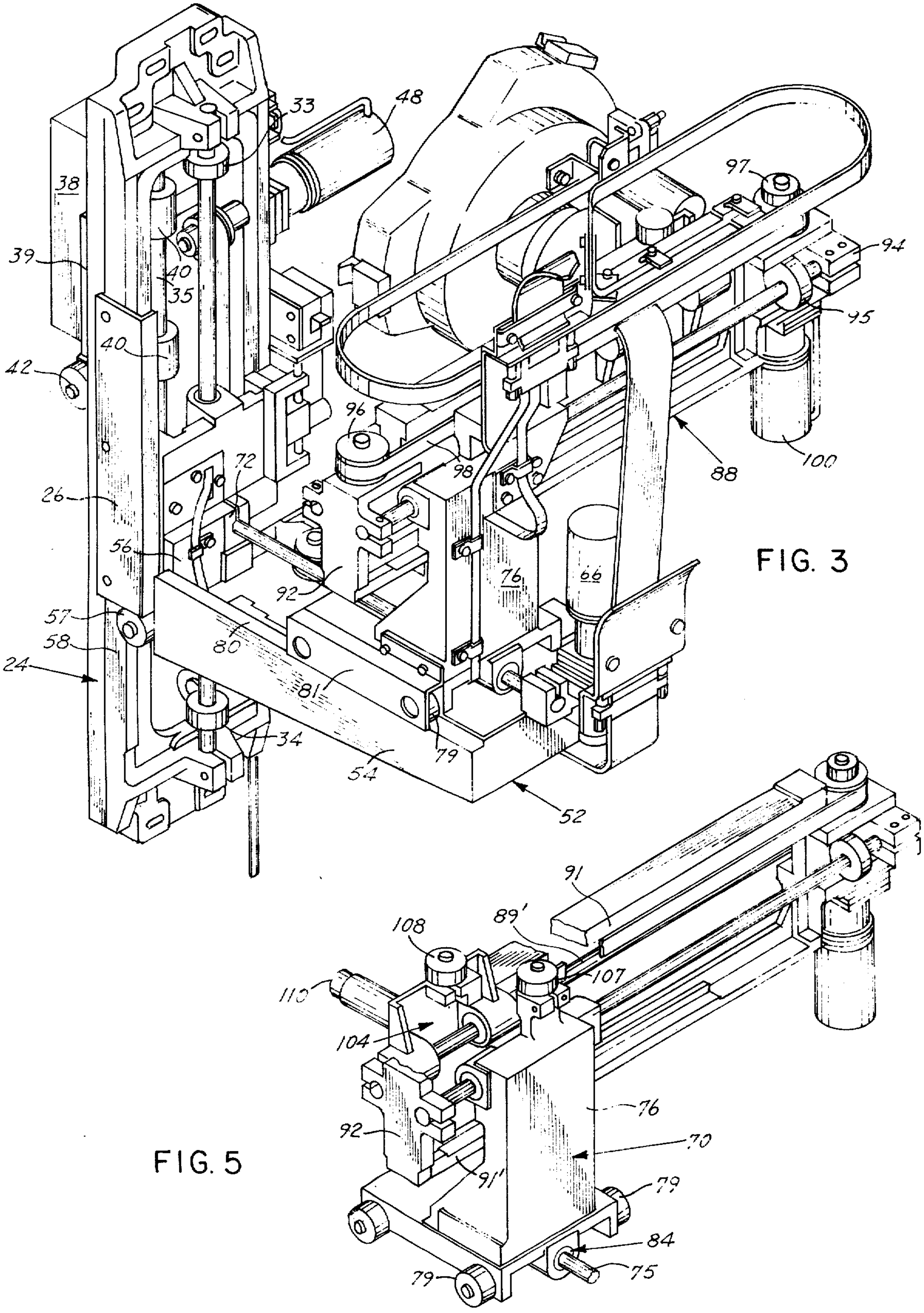
FIG. 3 is a perspective view of a preferred form of automatic reel mount assembly in accordance with the present invention.
FIG. 5 is another perspective view of a portion of the carriage drive for the chuck assembly.
Figure 3A:
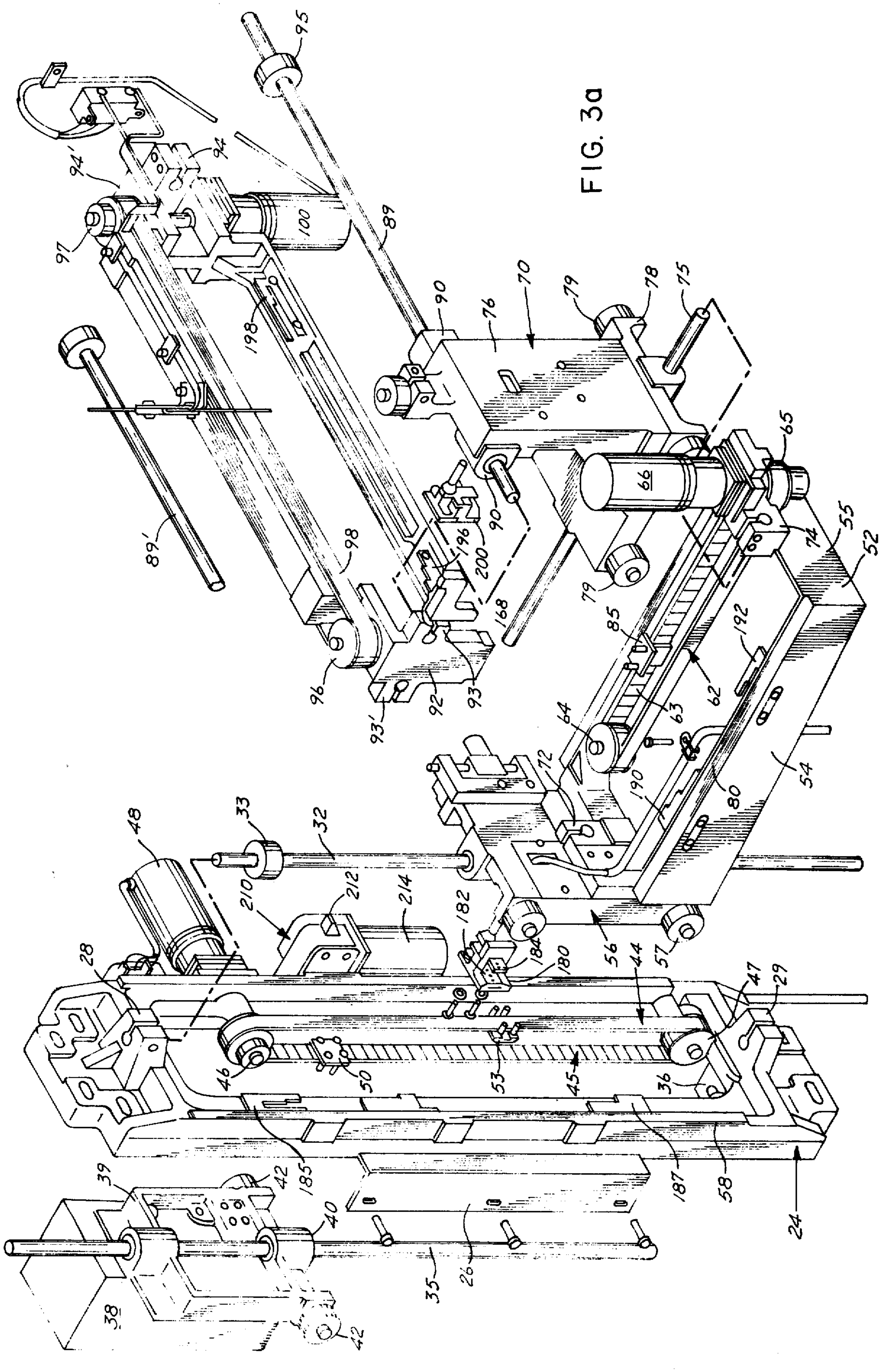
FIG. 3A is an exploded view of the assembly shown in FIG. 3.

In advancing the tape cartridge between the pre-load station 12, tape drive D and post-load station 14 it is desirable that the automatic reel mount assembly accomplish same by undergoing linear advancement in a first horizontal direction axially of the stations 12 and 14 as well as the tape drive hub H, a second horizontal direction transversely of the axis of the tape drive hub in advancing the tape cartridge through the passageway P, and in a third vertical direction in aligning the tape cartridge vertically with respect to each of the stations 12 and 14 and the tape drive D. For this purpose, and as shown in FIGS. 2, 3 and 3A, the automatic reel mount assembly 10 is suspended from an open, generally rectangular frame, hereinafter referred to as carriage mount 24, which is secured by upper and lower brackets 26 at opposite ends to vertical supports 27 along one side of the passageway P. The carriage mount includes top and bottom end supports 28 and 29, respectively, each provided with a central opening 30 for reception of opposite ends of a vertical support rod 32, the latter being provided with upper and lower limit stops 33 and 34, respectively. In a corresponding manner, a counterweight shaft 35 is supported by top and bottom end supports 36 on the back surface of the carriage mount 24 directly behind the front supports 28 and 29. A counterweight or counterbalance assembly 38 is mounted on the carriage mount 24 by means of a mounting bracket 39 journaled by bushings 40 on the shaft 35 and guided along the back surface of the carriage mount 24 by guide rollers 42 on opposite sides of the mounting bracket 39.

Mounted within the open central portion of the carriage mount 24 is a flexible, endless drive belt 44 which has cogs 45 evenly spaced along its inner surface and which are trained for advancement over upper and lower sprockets 46 and 47, respectively. The upper sprocket 46 defines a drive sprocket which is affixed to a motor drive shaft extending through one side of the carriage mount from a reversible drive motor 48 for the purpose of driving the belt at a predetermined rate of speed vertically in either direction within the open central area of the carriage mount. It will be seen that the counterbalance assembly includes on its mounting bracket 39 a portion 50 which is attached to the rear side of the drive belt 44. In turn, the vertical carriage drive 52 for the automatic reel mount assembly is clamped as at 53 to the front surface of the drive belt 44 and serves as the main suspension arm for the entire reel mount assembly in guiding and controlling its movement in a vertical direction. Accordingly, the counterweight assembly 38 will effectively counterbalance the weight of the reel mounting assembly 10 as it is caused to undergo vertical travel under control of the drive motor 48 over a distance substantially corresponding to the distance between the upper and lower sprockets 46 and 47; and the assembly 10 is limited in its travel by the upper and lower limit stops 33 and 34, respectively.

The vertical carriage drive 52 includes an open, generally rectangular bed 54 which has a closed end 55 and a mounting bracket 56 at its opposite ends. The mounting bracket 56 includes upper and lower pairs of guide rollers 57 on opposite sides engageable with ways 58 along the front surface of the carriage mount, and upper and lower bushings 60 are located centrally of the mounting bracket to receive the guide rod or shaft 32 on the carriage mount, the upper bushing 60 only being shown in FIGS. 3 and 3A. As described, the mounting bracket is provided with a clamp 53 affixed to the belt drive 44 to control vertical travel of the carriage drive along the carriage mount between the upper and lower limit stops 33 and 34.

The vertical carriage drive also includes a horizontal drive belt assembly consisting of a drive belt 62, provided with cogs 63 on its inner surface, trained for advancement over spaced sprockets 64 and 65 mounted on the bed 54. The sprocket 64 is disposed within the central opening along one side of the bed 54, and the drive sprocket 65 is mounted just externally of the closed end 55 on a drive shaft, not shown, extending downwardly from reversible drive motor 66. The drive belt assembly serves to control horizontal movement of the chuck assembly in a direction toward and away from the pre-load and post-load stations 12 and 14 as well as the tape drive D through the horizontal carriage drive 70. For this purpose, an end support 72 is affixed at one end of the bed 54, and end support 74 is permanently affixed to the opposite closed end 55 of the horizontal bed 54 and is provided with central openings to receive opposite ends of guide rod 75 for the horizontal carriage drive 70.

The horizontal carriage drive 70 is made up of an upstanding frame 76 which extends upwardly from a mounting bracket 78, the latter having sets of guide rollers 79 on opposite sides which travel on ways 80 extending along opposite sides of the upper surface of the horizontal carriage bed 54; and if desired guide brackets 81 may be affixed to the vertical frame 76 to extend over the guide rollers 79 and ways 80 to serve as a safety shield for the rollers as the horizontal carriage drive 70 travels along the bed 54. The mounting bracket 78, which is of inverted, generally U-shaped configuration, is journaled to the guide rod 75 by spaced bushings 84 and is provided with a clamp 85 beneath opposite ends of the mounting bracket 78 to clamp the entire horizontal carriage drive to the drive belt 62 in following movement of the drive belt 62 under control of the reversible drive motor 66.

The upper end of the vertical frame 76 is adapted for mounting of another horizontal carriage drive mechanism 88 for the chuck assembly which through guide rod 89 is journaled on bushings 90 for travel horizontally in a direction transverse to and above the horizontal carriage drive 70 so as to cause movement of the chuck assembly in a horizontal direction through the passageway P. Carriage drive 88 includes an elongated bed 92 having upper and lower bearing surfaces 91 and 91', the bed 92 being dimensioned to be of a length to travel at least one-half the distance between the pre-load and post-load stations 12 and 14 and the tape drive D; and movement of the chuck assembly with respect to the upper carriage drive 88 from one end to the other will make up the other one-half of the movement in a manner to be described. Opposite ends of the guide rod 89 are mounted in end supports 93 and 94 at opposite ends of the carriage drive 88 and a limit stop 95 is positioned at the righthand end of the rod 89, as shown in FIGS. 3 and 3*a*. Mounted directly above opposite ends of the carriage bed 92 are sprockets 96 and 97 over which is trained a drive belt 98, the sprocket 97 serving as the drive sprocket which is keyed to motor drive shaft from reversible drive motor 100.

The upper end of the vertical frame 76 is provided with a belt clamp, not shown, for clamping to the drive belt 98 whereby movement of the drive belt will drive the carriage bed 92 with respect to the vertical frame 76 and will effect endwise or longitudinal movement of the bed 92. Correspondingly, end supports 93' and 94' are positioned on the carriage bed 92 on sides opposite to the end supports 93 and 94, the end supports 93' and 94' receiving opposite ends of a guide rod 89' upon which is mounted the chuck carriage 104, as best seen from FIGS. 4 and 5. Again the chuck carriage is provided with spaced bushings 105 for the guide rod 89', and an upper clamp portion 106 is clamped on the opposite side of the drive belt 98 to that of the horizontal carriage drive 88 but at an end opposite to the point of clamping engagement of the horizontal carriage drive. In this way, when the horizontal carriage drive 88 is advanced to the right, as viewed in FIG. 3, to its furthest extent, the chuck assembly also will have been advanced to the right to its furthest extent. Conversely, when the carriage drive 88 is advanced to the left until the limit stop 95 moves into engagement with the vertical frame 76, the chuck assembly will have moved to the left to its furthest extent. As a result, the travel of the carriage drive 88 in its movement with respect to the vertical frame. In this movement an upper guide roller 107 on the vertical frame 76 travels along the upper bearing surface or way 91 on the carriage bed 92 and a pair of rollers 107' on the vertical frame 76 travel along a lower bearing surface 91' in guiding travel of the carriage bed with respect to the vertical frame 76.

Figures 4, 8:
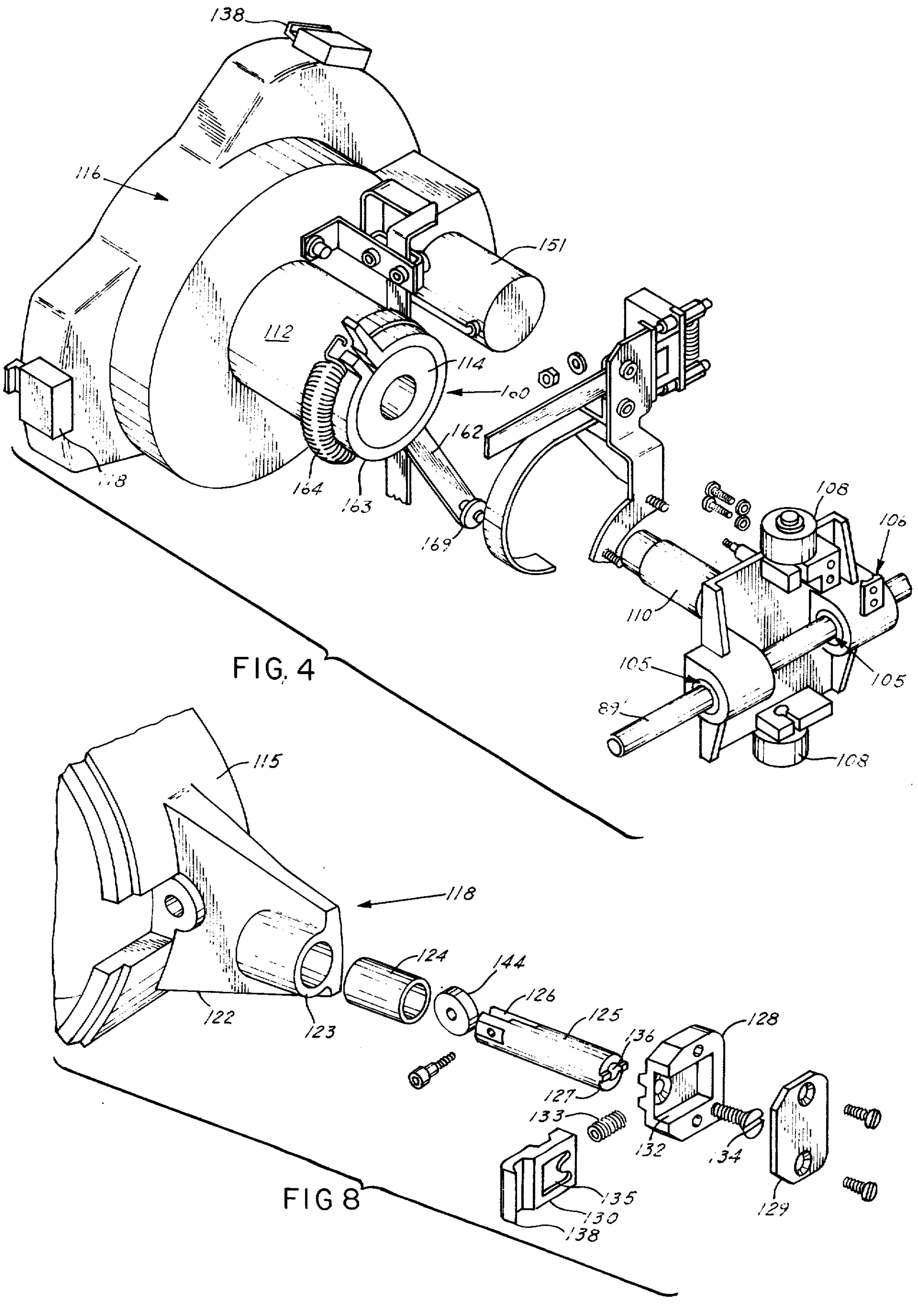
FIG. 4 is an exploded perspective view of the chuck assembly forming a part of the automatic reel mount.
FIG. 8 is somewhat exploded perspective view of a retractible finger unit in the chuck assembly.
Figures 6, 7:
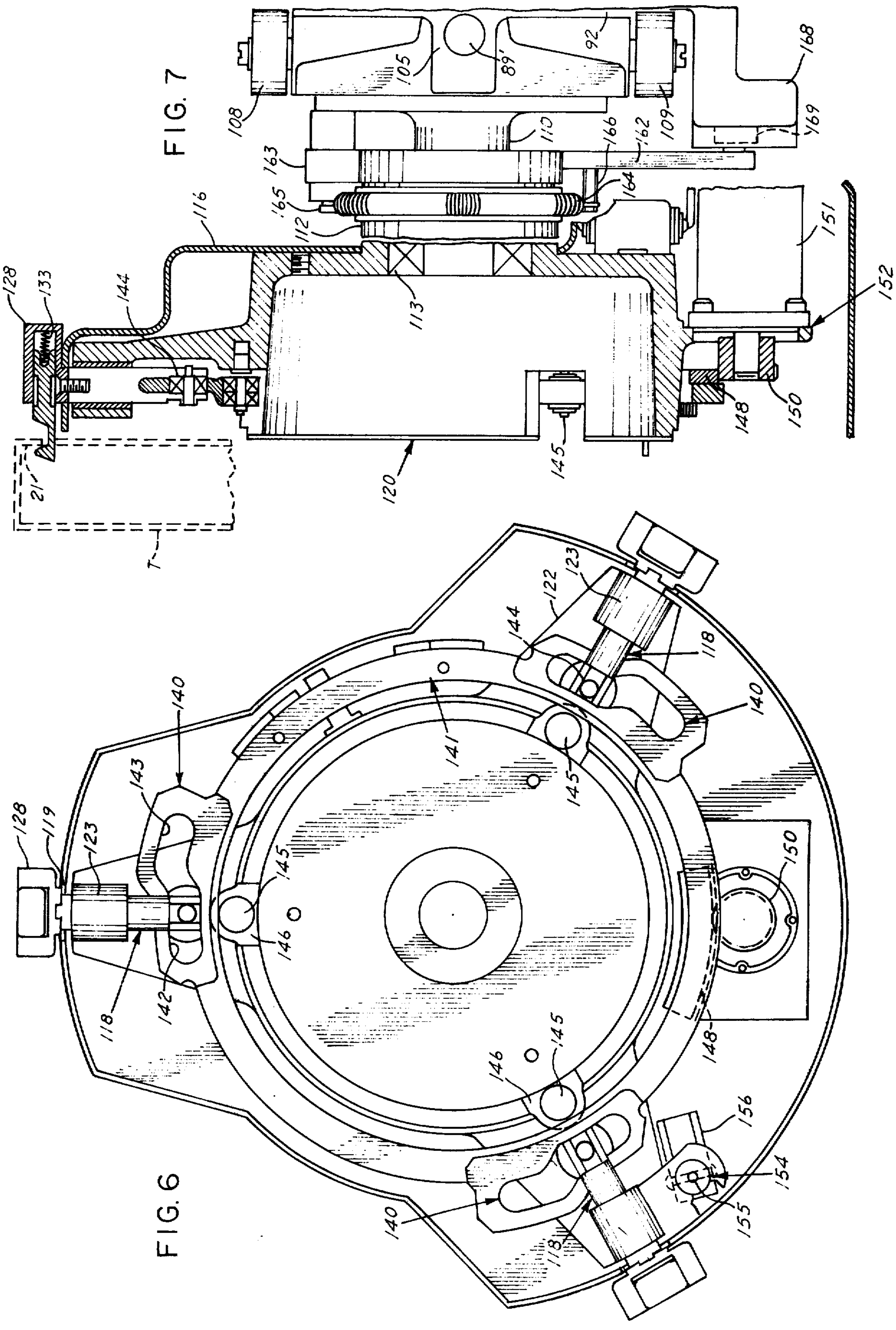
FIG. 6 is a front elevation view of the preferred form of chuck assembly.
FIG. 7 is a side view of the preferred form of chuck assembly.

As further shown in FIGS. 4, 6 and 7, the chuck carriage includes upper and lower guide rollers 108 and 109 which bear against the horizontal bearing surfaces 91 and 91' on the carriage bed 92 as the chuck carriage traverses the carriage bed in its horizontal movement. A mounting shaft 110 projects horizontally from the center of the chuck carriage and is journaled in ball bearing assemblies 113 and 114 at opposite ends of sleeve 112 which forms a rearward central extension of the chuck housing 115 whereby the chuck assembly is rotatable with respect to the mounting shaft 110 and chuck carriage 104. The chuck housing 115 is of generally cylindrical configuration and mounted within the open end of a generally cylindrical cover 116 as seen from FIGS. 8 and 9. The preferred form of chuck assembly, as illustrated in FIGS. 6 to 9, is specifically designed for use in conjunction with a self-threading tape cartridge as described and specifically wherein the chuck is capable of physically holding the tape reel and cartridge without direct engagement either with the external surface of the cartridge or of the internal hub yet will effect engagement in a positive, reliable manner without causing wear, disfiguration or marring of the cartridge or reel surfaces. To this end, the chuck housing assembly is broadly comprised of the chuck housing 115 and chuck cover 116, with three radially extending extractor or finger assemblies 118 arranged at equally spaced circumferential intervals around the external surface of the chuck housing 115 and projecting radially outwardly through slots 119 formed in the outer periphery of the chuck cover 116. The extractors 118 are capable of radial extension and retraction under the control of cam tracks 140 on a common cam ring 141 in moving into and out of engagement with the inner peripheral edge 21 of the rim of the tape cartridge T as illustrated in FIGS. 1 and 7. In addition, the chuck housing is provided with a circular cushion 120 extending partially around the front peripheral edge of the housing for the purpose of contacting the surface of the reel face as the chuck assembly is advanced into engagement with the tape cartridge.

Considering in more detail the construction and arrangement of the chuck extractors, there is illustrated in FIGS. 8 and 9 one of the chuck extractors 118 which is seen to consist of a flange 122 projecting radially outwardly from the external surface of the chuck housing and is provided with boss 123 in which is inserted bushing 124 for rod 125, the latter having a longitudinal open slot 126 at its inner end. The outer distal end 127 of the rod has affixed thereto a slide housing 128, including a cover 129, and slide plate 130 is dimensioned for slidable movement within the cavity 132 formed in the slide housing 128. The slide plate 130 is spring-loaded within the cavity by a compression spring 133 and a retention screw 134 is threaded into a bore 136 on the end of the rod 125. The slide member 130 is also provided with a tapered lip 138 at its outer extremity facing in an outward radial direction, as shown in the assembly view of FIG. 8, and is normally urged forwardly in a direction transverse to the length of the extractor by the compression spring 133.

In order to control radial extension and retraction of the extractor fingers 118, the inner slotted end 126 of the rod 125 is passed over the outer edge of each cam track 140, each cam track being provided with an inner recessed, circumferentially extending portion 142 curving into an outer recessed circumferentially extending portion 143. A cam follower defined by ball bearing 144 is passed through the aligned openings in the inner extremity of the slotted end 126 of the rod, and the bearing 144 is dimensioned to freely slide along the outer edges or cam surfaces formed by the portions 142 and 143. Most desirably, the cam profile is designed with a negative angle of engagement to provide self-locking of the cam fingers.

The cam tracks 140 are disposed at equally spaced circumferential intervals around the cam ring 141, and the cam ring 141 is supported for rotational movement with respect to the housing by cam bearings 145 located in slots 146 in the housing wall radially inwardly of the cam tracks 140. As shown in FIGS. 6 and 7, the cam ring 141 is provided with a cam gear 148 on the rear surface of the ring 141 adjacent to its lower edge beneath the lower cam track 140, and gear segment 148 intermeshes with a spur gear 150 driven by gear motor 151, the latter being supported by an extension plate 152 on the chuck. An RF1 filter 153 for gear motor 151 is mounted on the back of the housing 115. In addition, one of the extractor flanges 122 has a reel sensor assembly 154 which includes a spring-loaded probe element 155 projecting forwardly a predetermined distance and associated with a photocell and diode arrangement represented at 156 to sense engagement of the probe 155 with a tape cartridge and determine when the slide members 138 have engaged the rim of the cartridge. When the probe is depressed by engagement with the tape cartridge to indicate that the slide members are positioned on the rim of the tape cartridge, a signal is generated by the diode to de-energize an associated transducer and stop the travel of the horizontal carriage drive 70.

In mounting the self-threading tape cartridge T on the tape drive hub H, it is necessary that the angular orientation of the tape cartridge T with respect to the hub H be established when the cartridge is moved into engagement with the hub. For this reason it is necessary that the chuck assembly be capable of rotating the tape cartridge through a limited angle to assure proper orientation on the tape drive hub. To this end, the chuck assembly is provided with a rotator generally designated at 160 which will impart limited turning to the chuck assembly and connected tape cartridge through a limited angle up to 60° without necessity of employing a separate power source or drive mechanism. As illustrated in FIGS. 4 and 7, the chuck rotator includes an arm 162 extending radially from a circular clamp 163 affixed to the external surface of the chuck assembly sleeve 112. The arm 162 is normally urged to the angular position shown in FIG. 4 by return spring 164 which is affixed at its upper end to a pin 165 extending from the carriage drive bed 92 and at its opposite lower end it is affixed to a pin 166 projecting inwardly and forwardly from the stationary arm 162.

An extension arm 168, shown in FIG. 7, projects downwardly from beneath the carriage bed 88 at the end adjacent to the sprocket 96 for engagement with bearing 169 at the lower terminal end of the arm 162 as the chuck assembly approaches the end of its travel toward the left-hand side of the carriage bed, and becomes aligned in front of the tape drive assembly D, as viewed in FIG. 3. The extension arm 168 will displace the arm 162 in a counterclockwise direction causing rotation of the entire chuck assembly and tape cartridge. As the chuck assembly and tape cartridge are advanced forwardly to move into engagement with the tape drive hub H, the tape cartridge will be properly aligned with the tape drive so that a key 21' on the tape cartridge T will be aligned with a key way in the tape drive assembly, in accordance with conventional practice. The requirement satisfied is that the tape cartridge T must be rotated a limited extent from its disposition on the pre-load station to that in the tape drive assembly in order to be properly oriented with respect to the tape drive assembly.

Considering in more detail the automatic mounting of a tape reel on the chuck assembly, in order for the chuck assembly to remove a tape cartridge from the pre-load station, and by reference to FIG. 3, it is advanced forwardly with respect to the carriage drive 54 by the drive motor 66 until the extractors 118 move into contact with the face of the tape reel. The resilient slide members 130 will yieldingly engage the surface of the tape reel until the sensor probe 155 is depressed, at which point the cam drive motor 151 is energized to rotate the cam ring 141 and cause the extractors 118 to be radially extended as the extractor rods 125 are advanced from the inner portion 142 of the cam 141 to the outer portion 143. Slides 130 are radially expanded with the lip 138 becoming firmly seated behind the inner peripheral edge 21 of the tape cartridge. If any of the extractors should fail to grip the cartridge the unsupported condition of the cartridge will be recognized by the reel sensor switch 154. Once seated, the chuck assembly drive is reversed by reversing drive motor 66 for removal of the tape cartridge from the pre-load station and advanced horizontally in a direction away from the station. The vertical drive motor 48 is energized to drive the carriage 54 downwardly to an intermediate position horizontally aligned with the tape drive, whereupon the horizontal carriage drive motor 100 is activated to carry the chuck assembly and tape cartridge to the far left-hand limit of its travel where the chuck assembly is aligned in front of the tape drive and the tape cartridge is angularly oriented as previously described. Again the chuck assembly is advanced forwardly with respect to the carriage way 54 until the tape cartridge is in position on the tape drive hub. The gear drive motor 151 is energized to drive the cam 141 in a reverse direction causing the extractors 118 to be retracted radially inwardly away from engagement with the tape cartridge, leaving the tape cartridge seated and positioned on the tape drive.

In order to drive the automatic reel mount assembly and specifically the chuck assembly to and from the different selected positions as described, a power supply and transducer cable assembly leads from a logic circuit, not shown, which is controlled by a computer or other external memory to regulate and control the movements of the automatic reel mount assembly and, as such, forms no part of the present invention. The main cable assembly may lead into the underside of the carriage bed 54 and has branch lines extending to the vertical drive motor 48 and to a transducer block assembly 180. The transducer block 180 is provided with a front bank of three light-emitting diodes 182 and a rear bank of three photocells 184 aligned opposite to the diodes 182. The diodes 182 and photocells 184 straddle a row of transducer strips on the vertical carriage mount, specifically including upper transducer control strip 185, intermediate transducer control strip 186 and a lower transducer control strip 187. The upper and lower transducer control strips 185 and 187 establish the upper and lower limits of travel of the carriage 54 by selectively blocking the passage of light from one or more of the diodes to the photocells and thereby controlling energization and deenergization of the drive motor 48. For example, in utilizing permanent magnet DC drive motors as the drive motors 48, 66 and 100 each can be caused to undergo forward or reverse travel, or can be dynamically braked by reducing voltage to the motor. Thus, as the carriage 54 approaches its upper limit of travel, the leading edge of the transducer control strip 185 will block one of the diode 182 to cause dynamic braking of the carriage. The second edge of the transducer control strip 185 will block an additional diode which through the logic circuit will reduce the motor torque 48 at a point coinciding with engagement of the upper limit stop 33 by the bushing 60. The lower transducer control strip 187 operates in a corresponding manner to brake then deenergize the motor 48 at the lower limit to travel.

Transducer control strips 190 and 192 are mounted adjacent to opposite ends of the carriage bed 54 and function in a like manner with respect to a transducer block assembly, not shown, which is positioned on the underside of the bracket 78 to limit travel of the horizontal carriage drive 70. The same is true of the transducer control strips 196 and 198 on the carriage bed 92 and which are straddled by transducer block assembly 200 in controlling horizontal travel of the chuck assembly.

The intermediate transducer control strip 186 on the carriage mount 24 is employed in cooperation with the limit stop assembly 210 on the opposite side of the carriage mount 24 to stop the downward vertical travel of the carriage bed 54 to align the chuck assembly horizontally with respect to the tape drive hub H. The assembly 210 includes a detent 212 controlled by motor 214. Normally the detent 212 is spring-loaded to the extended position shown in FIGS. 3 and 3*a*. When the motor 48 is energized to drive the carriage 54 downwardly from the upper limit of travel movement of the transducer block assembly 180 across the leading edge of the strip 186 will dynamically brake the motor until it reaches the second edge of the strip 185, at which point the detent 212' will engage the detent 212 and the motor 48 is deenergized. This will occur when the chuck assembly is to be advanced horizontally from the pre-load station to the tape drive hub.

Subsequently, upon retrieval of a tape cartridge T from the tape drive and preliminary to horizontal advancement toward the post-load station, the motor 214 is energized momentarily by the logic circuit from the computer to retract the detent or latch 212 and energize the motor 48 to drive the carriage 54 downwardly until it is braked and deenergized as coded by the lower transducer control strip 187.

In the power supply and transducer cable package, another branch line extends to the drive motor 66 for activating the carriage 70 in a horizontal direction along the bed 54 toward and away from the vertical carriage mount 24; and the transducer strips 190 and 192 are mounted within the carriage bed 54 to establish limits of travel of the carriage assembly in its movement along the bed 54 through a transducer block, not shown, located beneath the carriage 70.

In order to drive the carriage bed 92 in a horizontal direction normal to the horizontal direction of travel of the frame 76, another conductor line leads into the drive motor 100. Additional lines are directed into transducer block 200 for the control strips 196 and 198 located at opposite ends of the bed 92 and which are responsive to horizontal travel of the bed 92 with respect to the carriage 70 to establish opposite limits of travel in the horizontal direction between the tape drive assembly D and the loading stations.

Still other conductors lead to the gear drive motor 151, and power lines are directed to the reel sensor switch 154. Briefly, closing of the reel sensor switch 154 upon engagement with the face of the tape reel will, through the logic circuit and computer, cause energization of the gear motor 151 to drive the cams in a direction radially expanding the cartridge extractors into positive engagement with the rim of the tape cartridge. The cartridge extractors are retracted either when the tape cartridge is mounted on the tape drive hub H or when mounted on the post-load station by reversing the gear motor 151 under the control of the logic circuit. Most desirably, the gear motor 151 is simply energized for a predetermined time interval sufficient to insure full extension and retraction of the extractors 118 and does not require external sensors.

From the foregoing, the automatic reel mount assembly of the present invention is capable of undergoing high-speed travel between the three basic positions of post-load, pre-load and tape drive under automatic control of the drive motors as described. Thus, the carriage assembly and associated chuck is capable of moving vertically, horizontally toward and away from the pre-load and post-load positions and the tape drive, as well as horizontally between the pre-load and post-load positions and the tape drive hub. Moreover, the chuck is capable of undergoing simultaneous rotation as the reel mount assembly is advanced horizontally between the loading stations and the tape drive hub.

In use, the start position for the reel mount assembly typically would have the chuck assembly at the upper limit of travel of the vertical carriage mount 24 aligned opposite the pre-load station and with the chuck fingers retracted. In order to pick up a tape reel deposited at the pre-load station, the chuck assembly is advanced forwardly along the carriage bed 54 until the reel is contacted. In response to the reel sensor, the chuck fingers are extended to positively engage the tape cartridge. The chuck assembly is then reversed in its travel with respect to the bed 54 and lowered to its intermediate vertical position and advanced horizontally through the passage into alignment opposite to the tape drive hub. As it travels horizontally, the chuck is rotated to establish the proper orientation between the reel and its mounting location on the tape drive. The chuck assembly is then driven forwardly to seat the reel on the tape drive hub, the chuck fingers are retracted, following which the chuck assembly is reversed to move away from the tape drive hub and to permit the tape drive to perform any necessary reading or writing of information on the tape reel.

In order to dismount the reel and restore to the library, the chuck assembly is advanced forwardly until the reel is contacted, the chuck fingers are extended to engage the cartridge, and the chuck is then reversed in its travel away from the tape drive hub in a horizontal direction. The chuck assembly is then advanced horizontally by driving the carriage bed 92 after the detent 212 has been retracted and the chuck assembly lowered to its lowermost position opposite to the post-load station. The chuck assembly is then driven forwardly until the reel is positioned in the post-load station, after which the chuck fingers are retracted and the chuck assembly is reversed away from the post-load station and returned to its start position.

From the foregoing, it will be appreciated that particular features of the automatic reel mount assembly as described include its capability of automatically handling magnetic tape reels, particularly those of the self-threading type, as well as high performance, precise positioning of the tape reels, ready conformability to accommodate automatic tape mounting on a series of tape drives of different manufacture, and permitting a number of tape reels to be handled simultaneously. For example, there may be one reel on the tape drive, one in the pre-load position or a third reel in the post-load position, each of which can be handled by the automatic reel mount assembly without disturbing the positioning mechanism of the library itself.

It is therefore to be understood from the foregoing that various modifications and changes may be made in the construction and arrangement of the preferred form of automatic reel mount assembly without departing from the spirit and scope of the present invention as defined by the appended claims.

What is claimed is:

1. An automatic reel mount assembly adapted for transferring a magnetic tape reel and the like having an outer peripheral edge and substantially flat surfaces on opposite sides thereof between an upright storage position and an upright tape drive position in spaced relation to the upright storage position, said automatic reel mount assembly comprising:

a chuck assembly including circumferentially spaced, reel-engaging members, reel-engaging control means being activated to selectively advance said reel-engaging members between a reel-engaging position and a released position with respect to the reel, and chuck drive means mounting said chuck assembly for advancement between said upright storage and tape drive positions, said chuck drive means including first chuck drive means for advancement of said chuck assembly between said storage and tape drive positions, and second chuck drive means for advancing said chuck assembly in a direction substantially perpendicular to and toward the side surface of a reel disposed at one of said storage and tape drive positions whereby to position said reel-engaging members on one side of the reel for engagement with the reel in response to activation of said reel-engaging control means.

2. An automatic reel mount assembly according to claim 1, further including rotational support means associated with said chuck for imparting rotation to said reel-engaging members about a central axis through said chuck assembly.

3. An automatic reel mount assembly according to claim 1, said chuck drive means including third chuck drive means mounting said chuck assembly on said first chuck drive means and operative to selectively advance said chuck assembly in a direction perpendicular to the direction of advancement of said first and second chuck drive means.

4. An automatic reel mount assembly adapted for transferring a magnetic tape reel and the like having an outer peripheral edge and substantially flat surfaces on opposite sides thereof between a storage station and tape drive station spaced from the storage station, said automatic reel mount assembly comprising:

a chuck assembly including circumferentially spaced, reel-engaging members arranged at substantially equally spaced circumferential intervals about the central axis of said chuck assembly, and reel-engaging control means operative to radially advance said reel-engaging members between a reel-engaging position and a released position with respect to the reel, first carriage drive means mounting said chuck assembly for advancement in a direction perpendicular to the axes of said storage and tape drive stations, and second carriage drive means associated with said first carriage drive means for advancing said chuck assembly in an axial direction toward and away from each of said storage and tape drive stations whereby to position said reel-engaging members on one side of the reel for engagement with the reel in response to activation of said reel-engaging control means.

5. An automatic reel mount assembly according to claim 4, said chuck assembly having reel-engaging members defined by radially extending arms at equally spaced circumferential intervals, cam means associated with each arm and selectively operable to radially extend and retract said arms in unison, each of said arms having reel-engaging slide members at their outer ends yieldingly engageable with the side surface of a tape reel, and reel sensing means to sense engagement of the slide members with the surface of a tape reel.

6. An automatic reel mount assembly according to claim 5 wherein the tape cartridge includes an outer peripheral rim in surrounding relation to the outer peripheral edge of a tape reel, said slide members being movable radially under the control of said cam means into engagement with the peripheral rim of the tape cartridge to positively engage the tape cartridge.

7. An automatic reel mount assembly according to claim 5, said cam means including an inner cam ring having cam tracks at spaced circumferential intervals and aligned with said reel arms, each of said reel arms having a cam follower bearing movable in said cam track, and drive means for selectively rotating said cam ring to impart inward and outward radial movement to said reel arms through said cam tracks.

8. An automatic reel mount assembly according to claim 7, each of said cam tracks being defined by inner and outer slotted portions in communication with one another to impart radial movement to said cam follower and attached reel arm in response to rotation of said each respective cam track.

9. An automatic reel mount assembly for transferring a magnetic tape cartridge having an outer peripheral rim in surrounding relation to a tape reel between first and second storage stations and a tape drive station wherein the tape cartridge is mounted in an upright position at each station and the first and second storage stations are spaced vertically with respect to one another and are spaced horizontally from and facing in the same direction as said tape drive station, said automatic reel mounting assembly comprising:

a chuck including circumferentially spaced, reel-engaging arms and reel-engaging arm control means operative to selectively extend and retract said reel-engaging arm members between a reel-engaging position engaging the peripheral rim of the tape reel cartridge and a retracted, release position away from the rim of the tape reel cartridge, first chuck drive means mounting said chuck for advancement in a vertical direction over a distance corresponding to the vertical spacing between said first and second storage stations, said first chuck drive means including a stationary guide frame mounted between said tape drive station and said first and second storage stations to guide vertical movement of said first chuck drive means, second chuck drive means associated with said first chuck drive means and operative to selectively advance said chuck assembly horizontally in a direction toward and away from each of said storage and tape drive stations, and third chuck drive means associated with said first and second chuck drive means and operative to horizontally advance said chuck in a direction perpendicular to the movement of said first and second chuck drive means.

10. An automatic reel mount assembly according to claim 9, said vertical guide frame being of open rectangular configuration, a vertical guideway on the front of said vertical guide frame, and a vertically movable carriage bed mounted for vertical travel along said guide way.

11. An automatic reel mount assembly according to claim 10, said vertical guide frame including a counterweight assembly counterbalancing the weight of said carriage bed in its vertical travel along the front guideway and power transmission means including a drive motor operative to cause vertical advancement of said carriage bed along said guide way.

12. An automatic reel mount assembly according to claim 11, said second chuck drive means having an upright frame mounted for horizontal advancement along the upper surface of said vertically movable carriage bed, and power transmission means on said vertically movable carriage bed for reversibly driving said upright frame in a horizontal direction.

13. An automatic reel mount assembly according to claim 12, said third chuck drive means including a horizontally extending carriage bed mounted on said upright frame for lengthwise movement in a direction transversely of the movement of said vertical frame, and power transmission means for imparting movement to said horizontally extending carriage bed with respect to said upright frame.

14. An automatic reel mount assembly according to claim 9, said third chuck drive means having an elongated horizontal carriage bed mounted for lengthwise movement with respect to said second chuck drive means, and said chuck mounted for movement lengthwise of said horizontal carriage bed in response to longitudinal movement of, and in the same direction as, said carriage bed.

15. An automatic reel mount assembly according to claim 14, said elongated horizontal carriage bed having transducers adjacent to opposite ends thereof, and transducer sensing means on said second chuck drive means operative to transmit a signal in response to movement of a leading edge of one of said transducers across said transducer sensing means.

16. An automatic reel mount assembly according to claim 14, said third chuck drive means including a reversible drive motor, power transmission belt means traversing the substantial length of said carriage bed and reversibly driven by said drive motor, means operatively connecting said power transmission belt means to said second chuck drive means on one side of said carriage bed, and connecting means operatively connecting said chuck to said power transmission belt means on the opposite side of said horizontal carriage bed, the point of connection of said chuck to said power transmission belt means being adjacent to one end of said carriage bed when said second chuck drive means is located at the opposite end of said carriage bed on the opposite side thereof whereby the effective distance of travel of said chuck is substantially twice the distance of travel of said horizontal carriage bed when said carriage bed is moved lengthwise by said power transmission belt means.

17. An automatic reel mount assembly according to claim 14, said chuck being journaled for rotation with respect to said horizontal carriage bed, a detent on said horizontal carriage bed, and a control arm on said chuck engageable with said detent when said chuck is advanced longitudinally with respect to said carriage bed to impart limited rotation to said chuck.

18. In an automatic reel mount assembly wherein a tape reel is mounted in a tape cartridge having an outer peripheral rim in surrounding relation to the tape reel including an inwardly directed peripheral edge portion extending along one face of the tape reel, said tape reel being disposable at one of a plurality of stations with the one face of the tape reel and peripheral edge of the tape cartridge exposed, a chuck for selectively engaging and disengaging said tape reel comprising:

a plurality of radially extending arms disposed at equally spaced circumferential intervals, each arm including a yieldable slide member at the outer end of each arm, and means biasing each slide member in a direction transversely of and forwardly away from its respective arm, cam means associated with the inner end of each arm including drive means selectively energizable to drive said cam means in one direction to cause outward radial movement of said arms and to drive said cam means in the opposite direction causing inward radial retraction of said arms, chuck control means for aligning said chuck in facing relation to a tape reel disposed at a station and for driving said chuck in a direction axially of the tape reel to force said slide members into engagement with the face of the reel inwardly of the peripheral edge of the tape cartridge whereby to overcome the biasing means and cause said slide members to be shifted rearwardly with respect to said arms, and said chuck control means being further operative to reverse movement of said chuck in a direction away from the face of the tape reel, and reel sensing means responsive to retraction of said slide members against the face of said reel to energize said cam drive means in a direction causing outward radial extension of said arms to a position forcing said slide members into engagement with the peripheral edge of said tape cartridge whereby the tape reel is removable from one station by said chuck for transverse to another station.

19. In an automatic reel mount assembly according to claim 18, said chuck journaled on said chuck control means, and rotating means for imparting limited rotation of said chuck with respect to said chuck control means.

20. In an automatic reel mount assembly according to claim 18, said cam means including a cam ring, cam tracks positioned on said cam ring at spaced circumferential intervals aligned with the inner ends of said radially extending arms, cam followers disposed at the inner ends of each of said arms and movable in said cam tracks to impart radial movement to said arms in response to rotation of said cam ring.

21. In an automatic reel mount assembly according to claim 18, each of said slide members including a housing at the outer end of each arm, said biasing means disposed in each of said housings behind said slide members to normally displace said slide members in a direction transversely of and projecting away from each respective arm and each slide member including a radially outwardly extending lip dimensioned to be wedged between the inner peripheral edge of the tape cartridge and the face of the tape reel to effect positive engagement therewith.

22. In an automatic reel mount assembly according to claim 21, said chuck further including a cushion on its front surface engagement with the face of the tape reel as said slide members move into engagement with the face of the tape reel.

* * * * *